United States Patent [19]

Sakurai

[11] Patent Number: 4,711,295

[45] Date of Patent: Dec. 8, 1987

[54] AIR CONDITIONER SYSTEM FOR AUTOMOBILES

[75] Inventor: Yoshihiko Sakurai, Konan, Japan

[73] Assignee: Diesel Kiki Co., Ltd., Tokyo, Japan

[21] Appl. No.: 758,963

[22] Filed: Jul. 25, 1985

[30] Foreign Application Priority Data

Jul. 25, 1984 [JP] Japan ................................ 59-154224

[51] Int. Cl.⁴ .............................................. F24F 3/00
[52] U.S. Cl. ...................................... 165/22; 165/42; 236/13; 236/49; 62/244
[58] Field of Search ....................... 165/22, 42, 43, 16; 236/13, 49; 62/244

[56] References Cited

U.S. PATENT DOCUMENTS

| | | | |
|---|---|---|---|
| 4,009,825 | 3/1977 | Coon | 165/22 |
| 4,434,932 | 3/1984 | Hara et al. | 236/49 |
| 4,470,270 | 9/1984 | Takada et al. | 62/244 |
| 4,473,109 | 9/1984 | Kojima et al. | 165/42 |
| 4,586,652 | 5/1986 | Sakurai | 236/13 |
| 4,658,888 | 4/1987 | Sakurai et al. | 165/22 |

FOREIGN PATENT DOCUMENTS

| | | | |
|---|---|---|---|
| 58-7486 | 2/1982 | Japan . | |
| 57-96013 | 6/1982 | Japan . | |
| 57-167819 | 10/1982 | Japan . | |
| 0084614 | 5/1984 | Japan | 62/244 |

Primary Examiner—William R. Cline
Assistant Examiner—John K. Ford
Attorney, Agent, or Firm—Wenderoth, Lind & Ponack

[57] ABSTRACT

An air conditioner system for a vehicle includes a front-seat air conditioner unit, a rear-seat blower unit, and at least one connecting passage interconnecting a main duct of the front-seat air conditioner unit and a rear-seat duct of the rear-seat blower unit. The front-seat air conditioner has a main blower to blow air into a front-seat part, and the rear-seat blower unit has a rear-seat blower to force blown-off air into a rear-seat part. The main blower and the rear-seat blower are controlled with a relationship between them and predetermined patterns. The main blower supplies additional blown air into the rear-seat part when needed.

3 Claims, 8 Drawing Figures

AIR CONDITIONER SYSTEM FOR AUTOMOBILES

BACKGROUND OF THE INVENTION

1. Field of the Invention

The present invention relates to air conditioner system for automotive vehicles, and more particularly to an an air conditioner system for controlling the amount of air blown into a front-seat part and a rear-seat part of a vehicle with a certain relationship between them.

2. Related Art

As shown in Japanese Utility Model Laid-open Publication No. 57-96013, it is conventional practice to dispose two separate air conditioner units in the vehicle passenger compartment. The disclosed system is disadvantageous in that the front air conditioner unit is substantially useless in air conditioning the rear-seat side and the air-conditioner system is wasteful as a whole.

In order to eliminate the foregoing drawback, there have been proposed air conditioner systems such as shown in Japanese Patent Publication No. 58-7486 and Japanese Patent Laid-open Publication No. 57-167819. The former publication shows a front-seat air conditioner unit which comprises at least one partition wall disposed in a main duct downstream of an evaporator so to defined a plurality of chambers or passages in which heater cores are disposed with air mix doors provided in front of the respective heater cores. The latter publication discloses a system wherein a heater core disposed in a main duct is subdivided into two portions, two air flow passages are defined downstream of the two heater core portions by means of a partition wall, and air mix doors are provided in front of the respective heater core portion to control the temperature of air passing through the respective passages. Both disclosed systems use a main blower in common for forcing air to a front-seat part and a rear seat part. Since the amount of air blown to a rear-seat part is influenced by a main blower, and is reduced during the forcing of air to the rear-seat part, an insufficient amount of air is blown into the rear-seat part, especially when it is necessary to quickly change the rear-seat temperature. Thus a difficulty arises in that cooling and heating effects do not appear immediately.

SUMMARY OF THE INVENTION

It is accordingly an object of the present invention to automatically provide the necessary amount of blown air for a rear-seat part in response to a demand for changing the rear-seat temperature quickly.

It is a further object of the present invention to provie such an air conditioner system which can ensure enough blown air into the rear-seat part, even if the rear-seat blower is small.

It is a further object of the present invention to provide such an air conditioner system which has a simple construction used to connect the front-seat air conditioner unit and a rear-seat blower unit via connecting passages.

According to the present invention, an air conditioner system for vehicles includes a passenger compartment having a front-seat part and a rear-seat part, said air conditioner system comprising a front-seat air conditioner unit including a main duct, a blower disposed in said main duct for forcing air therethrough to the front-seat part, an evaporator disposed in said main duct and a heater core disposed in said main duct; a rear-seat part blower unit including a rear-seat duct and a rear-seat blower disposed in said rear-seat part; at least one connecting passage interconnecting said main duct downstream of said main blower and said rear-seat duct upstream of said rear-seat blower; a means for setting the temperature of said front-seat part; a means for setting the temperature of said rear-seat part; a means for controlling said rear-seat blower according to control patterns which depend on at least the output signal of said means for setting the temperature of said rear-seat part; a means for determining if the set temperatures of the means for setting the temperature of said front-seat part and, the means for setting the temperature of said rear-seat part are at maximum or minimum values; a means for controlling said main blower according to control patterns which depend on said determining means. Consequently, the blown air by said main blower disposed in said front-seat air conditioner unit and the blown air by said rear-seat blower disposed in said rear-seat blower unit are forced to the rear-seat part, and the control pattern is changed by said main blower control means according to the result of said deciding means for the changing of the temperature of the rear-seat part quickly.

Many other advantages and features of the present invention will become manifest to those versed in the art upon making reference to the detailed description and the accompanying sheets of drawing in which preferred structural embodiments incorporating the principles of the present invention are shown by way of illustrative example.

DETAILED DESCRIPTION

The present invention will now be described in detail with reference to the illustrated embodiments.

Figure 2:
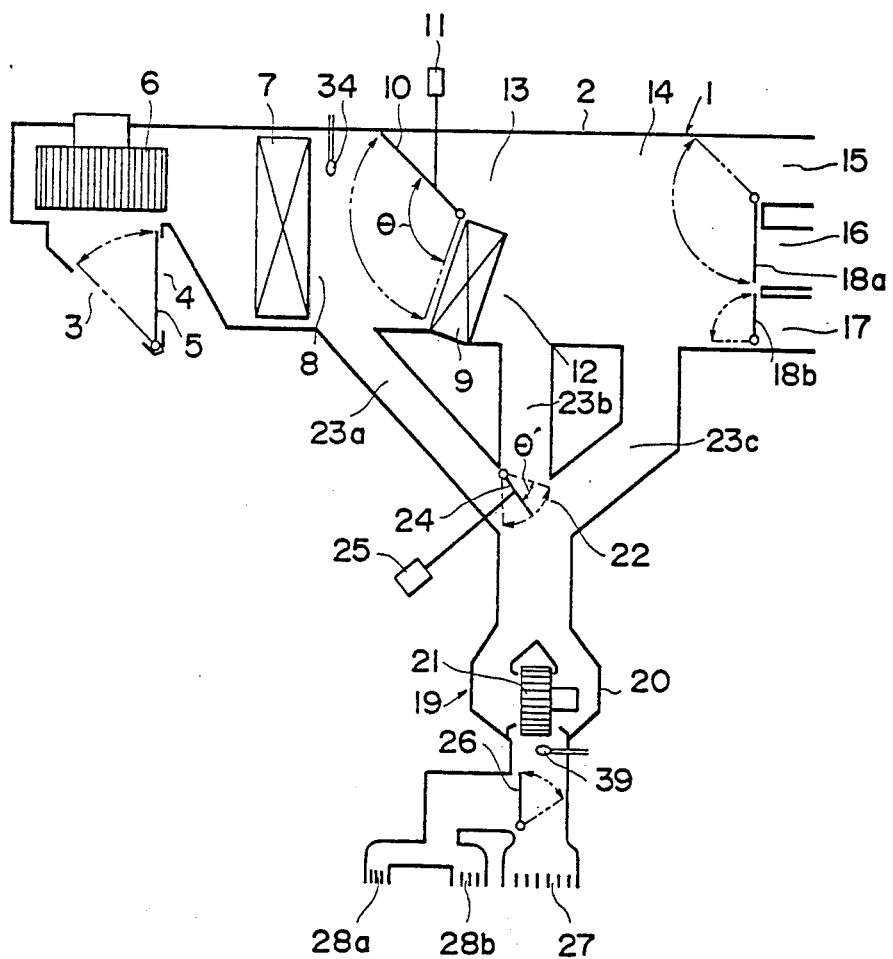
FIG. 2 is a schematic view of an embodiment of an air conditioner system according to the present invention.

Referring to FIG. 2, there is shown a first embodiment of a main part of an air conditioner system according to the present invention. The air conditioner system comprises a front-seat air conditioner unit 1 including a main air flow duct 2 which has a recirculated air inlet 3 and an outside air inlet 4 provided in a branched fashion. A door 5 is provided between the branched inlets 3 and 4 to select one of the inlets 3 and 4.

A main blower 6 is disposed in the main duct 2 immediately downstream of the inlets 3 and 4 to force air through the duct 2 from the recirculated air inlet 3 or the outside air inlet 4.

A evaporator 7 forms a refrigerant cycle together with a compressor and other related components, neither shown and cools the air passing therethrough. The cooled air then flows through a cool air passage 8 defined downstream of the evaporator 7.

A heater core 9 is disposed downstream of the evaporator 7, and the first air mix door 10 is disposed upstream of the heater core 9. The first air mix door 10 controls the ratio of the amount of air passing through a hot air passage 12 to the amount of air passing through a bypass passage 13. The heater core is disposed in the hot air passage 12, and the bypass passage 13 is provided at the side of the heater core 9. The hot air passage 12 and the bypass passage 13 are blended at a main air mix chamber 14 where the air which passes through these passage 12 and 13 are mixed so as to control the temperature of the air discharged or blown to a front-seat part at a desired value.

The first air mix door 10 is operatively controlled by a first actuator 11 to move between a full heat position in which the air passes solely through the heater core 9, and a full cool position in which all of the air bypasses the heater core 9. Accordingly, the temperature of the air thus mixed in the air mix chamber 14 can be adjusted to a desired value in dependence upon the position of the first air mix door 10.

Figure 1:
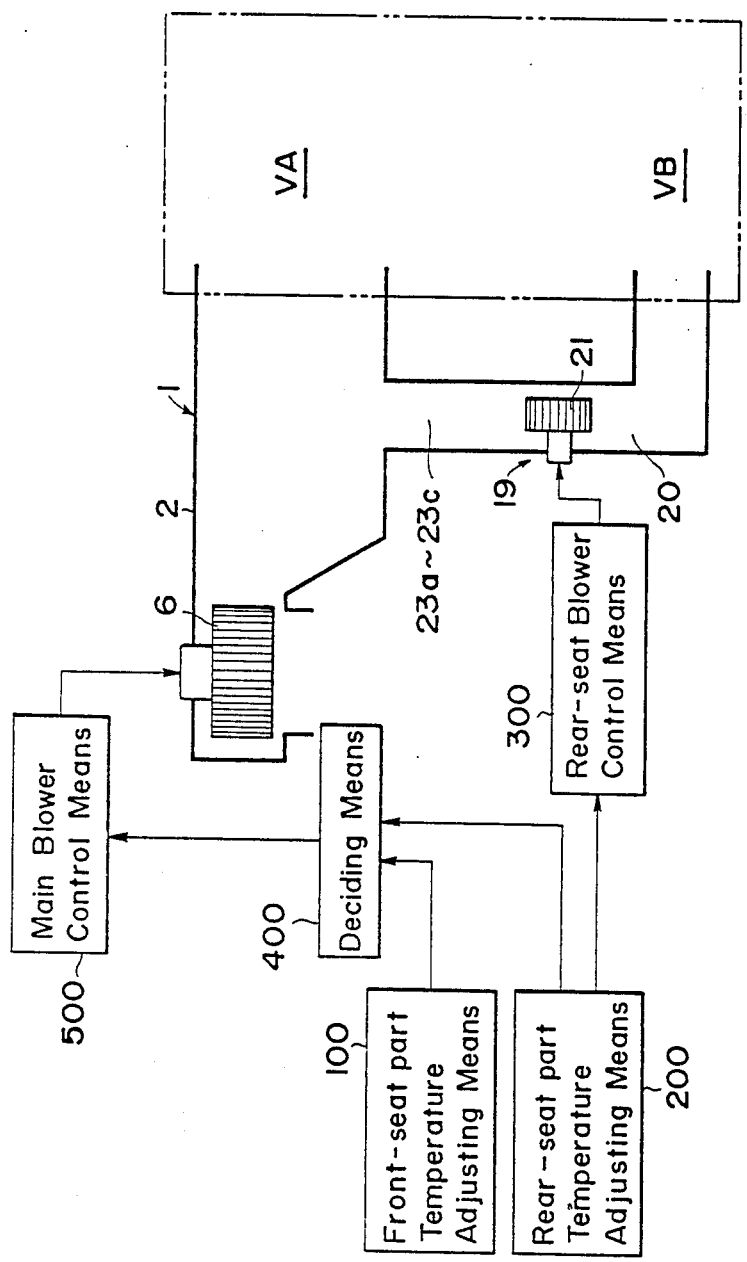
FIG. 1 is a block diagram showing an air conditioner system according to the present invention.

The air mixed in the air mix chamber 14 is discharged into a front-seat part of the vehicle passenger compartment VA (as shown in FIG. 1) through a front upper outlet or a vent outlet 15, a front lower outlet or a heater outlet 16 and or a defroster outlet 17. A door 18a selects the upper outlet 15 or the lower outlet 16 whereas a door 18b is operable to open or block the defroster outlet 17.

The air conditioner system also comprises a rear-seat blower unit 19 for forcing blown air into a rear-seat part VB (as shown FIG. 1), and it includes a rear-seat duct 20 and a rear-seat blower 21 for forcing air through the rear-seat duct 20. The rear-seat duct 20 includes a rear-seat air mix chamber 22 disposed upstream of the rear-seat blower 21. The air mix chamber 22, in the illustrated embodiment, communicates with the main duct 2 through first to third connecting passages 23a–23c. The first connecting passage 23a has an inlet opening to the cool air passage 8 defined between the evaporator 7 and the heater core 9. The second and third connecting passages 23b and 23c have inlets, respectively, opening to the main duct 2 downstream of the heater core 9. Stated more specifically, the inlet of the second connecting passage 23b opens to an end portion of the hot air passage 10 adjacent to the main air mix chamber 14 whereas the inlet of the third connecting passage 23c opens to a position immediately downstream of the main air mix chamber 14.

The third connecting passage 23c interconnects the main air mix chamber 14 and the rear-seat air mix chamber 22, and the temperature of the air passing through the third connecting passage 23c is used as standard temperature for controlling the temperature of the air blown into the rear-seat part. Thus the temperature of the air blown into the rear-seat part is controlled at least by the third connecting passage 23c, and it is possible to control the temperature of the air blown into the rear-seat part without the third connecting passage 23c which interconnects the main air mix chamber 14 and the rear-seat air mix chamber 22, the air passing through the third connecting passage 23 is used to set the standard temperature of the air blown into the rear-seat part. The third connecting passage 23c may be connected to a passage which is extended to the vent outlet 15.

A second air mix door 24 is disposed at a opening of the first and second connecting passage 23a and 23b in order to adjust the amount of air which is blown into the rear-seat air mix chamber 22 after passing through the first and second passages 23a and 23b. The second air mix door 24 is joined to a second actuator 25 which operates the second air mix door 24, and the amount of air blown into the rear-sear part is adjusted depending on the openings of the door 24.

The rear-seat duct 20 is bifurcated into two branch duct portions at a position downstream of the blower 21. A rear-seat mode door 26 is disposed between the bifurcated branch duct portions and one of their bifurcated branch duct portions has a central vent outlet 27 opening to the rear-seat part of the passenger compartment. The other branch duct portion is further branched into left and right heat outlets 28a and 28b. The rear-seat mode door 26 is provided to select either the vent port 27 or the heat outlets 28a and 28b.

Figure 3:
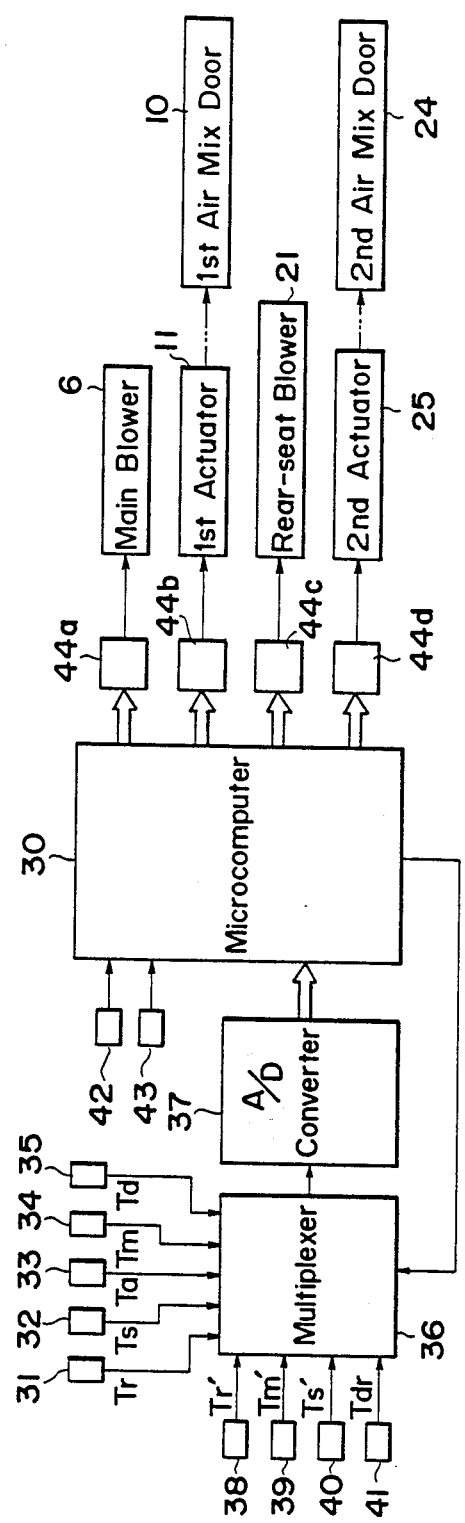
FIG. 3 is a block diagram of an electric control unit embodied in the air conditioner system of FIG. 2.

FIG. 3 shows an electric control unit for controlling the main blower 6, the first air mix door 10, the rear-seat blower 21 and the second air mix door 24. The electric control unit comprises a microcomputer 30 of the type known per se, including a central processing unit (CPU), a random access memory (RAM), a read only memory (ROM), input and output gates (I/O). The numeral 31 denotes an inside temperature sensor for detecting the temperature Tr of the front-seat part of the passenger compartment; element 32 is a front-seat radiant heat sensor for detecting the light quantity Ts of the sun incident to the top portion of a dashboard, for example, exposed to the incident light of the sun; element 33 is an outside temperature sensor for detecting the temperature Ta outside the passenger compartment; element 34 is a front-seat mode sensor (as shown in FIG. 2) for detecting the temperature Tm of the cooled air passing through the evaporator 7; element 35 is front-seat temperature setter for setting the temperature Td of the front-seat part. A multiplexer 36 is responsive to a selection signal from the microcomputer 30 to sequentially deliver to an A/D converter 37 the analog signals from the sensors 31–34 and the temperature setter 35. The A/D converter 37 converts analog signals delivered from the multiplexer 36 into digital signals and delivers the digital signals to the microcomputer 30. The input signals Tr, Ts, Ta, Tm, Td are used for controlling the main blower 6 and the first air mix door 10. Furthermore, the numeral 38 denotes a rear-seat temperature sensor for detecting the temperature Tr' of the rear-seat part of the passenger compartment; element 39 is a rear-seat mode sensor (as shown in FIG. 2) for detecting the temperature Tm' of the blown air for the rear-seat part; element 40 is a rear-seat radiant heat sensor for detecting the light quantity Ts' of the sun incident to a rear tray, for example, and element 41 is a rear-seat temperature setter for setting the temperature Tdr of the rear-seat part. These signals Tr', Tm', Ts', Tdr from the sensors 38–40 and the temperature setter 41 are inputted to the microcomputer 30 via the multiplexer 36 and the A/D converter 37 in the same fashion as the signals Tr, Ts, Ta, Tm, Td. The signals Tr', Tm', Ts', Tdr are used for controlling the rear-seat blower 21 and the second air mix door 24. Stated more specifically, in this first embodiment, the front-seat temperature setter 35 corresponds to the front-seat temperature adjusting means 100 shown in FIG. 1, and the rear-seat temperature setter 41 corresponds to the rear-seat temperature adjusting means 200.

Figure 4:
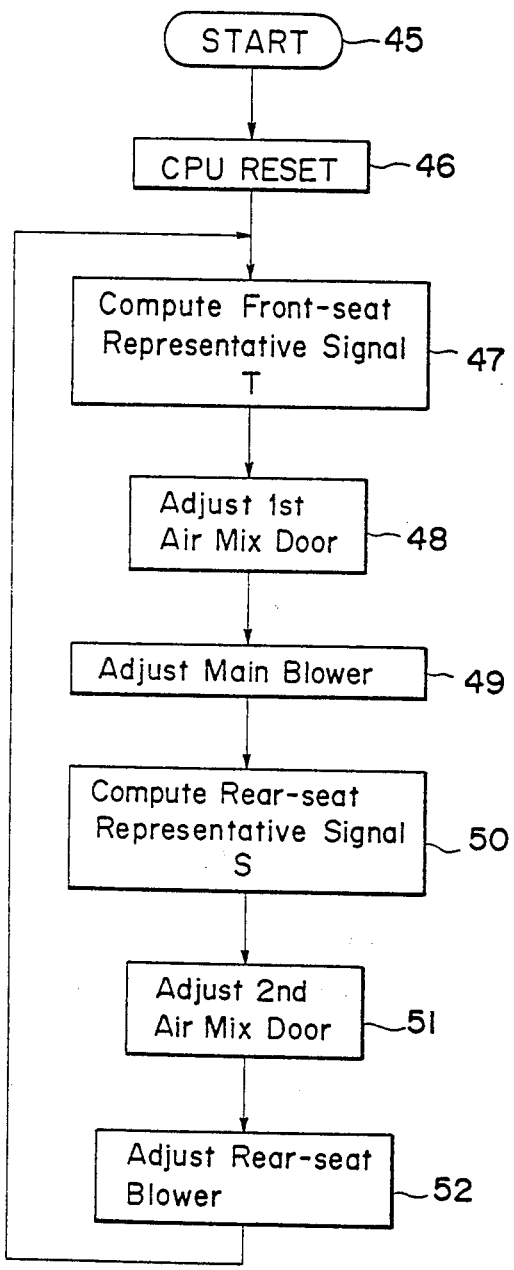
FIG. 4 is a flow-chart showing the operation of a microcomputer in the electric control unit shown in FIG. 3.

A passenger switch 42 detects whether or not a passenger is in a passenger compartment. A water temperature switch 43 detects whether or not the temperature of engine cooling water is higher than a predetermined value. The microcomputer 30 is inputted the signals from the passenger switch 42 and the water temperature switch 43. In accordance with a predetermined program, the microcomputer 30 computes control signals which are then supplied through driver circuits 44a-44d to the main blower 6, the first actuator 11, the rear-seat blower 21 and the second actuator 25. The operation of the microcomputer 30 is described below with reference to the flowchart shown in FIG. 4.

When a main switch is closed the microcomputer 30 is operated to start the program from a first step 45. In the next step 46, the CPU is reset to clear its content and then the computation is started in a step 47.

In the step 47, the selection signal is delivered to the multiplexer 36 whereupon various signals indicative of the temperatures Tr, Ts, Ta, Tm and Td are inputted into the microcomputer 30 wherein a front-seat representative signal T is computed in accordance with the following equation.

$$T = (Tr-25) + K_1(Ts-25) + K_2(Ta-25) + K_3(Tm-Tm_0) - K_4(Td-25) \quad (1)$$

Where $K_1$-$K_4$ are gains of the respective sensors and setters and $Tm_0$ is a reference value of the mode sensor 34.

Figure 5:
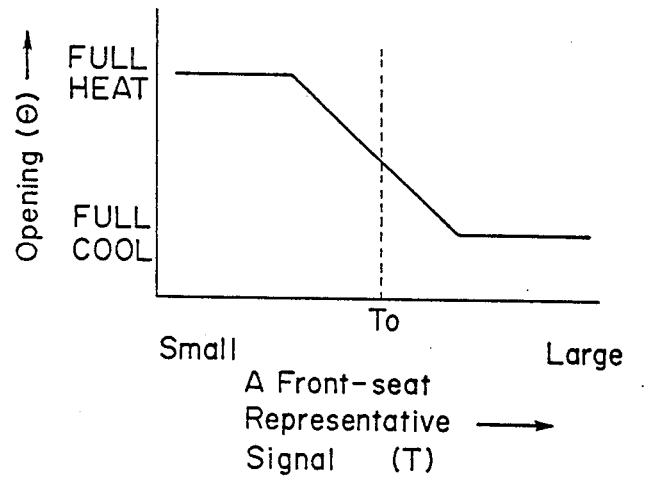
FIG. 5 is a graph illustrative of the controlling of a first air mix door with respect to a front-seat representative signal value T.

In the subsequent steps 48 a first air mix door control signal is computed so as to bring the relationship between the position of the first air mix door 10 and the representation signal T obtained by the equation (1) near to those values stored in the ROM (FIG. 5). In FIG. 5, To is the thermally balanced value of the representative signal T. These control signals are sent to the driver circuits 44b. However, when the front-seat temperature setter 35 is set for maximum cooling MC (corresponds to minimum temperature) or maximum heating MH (corresponds to maximum temperature), the microcomputer 30 outputs signals for keeping a position of the first air mix door 10 at full-cool (In FIG. 2, $\theta = 0\%$) or full-heat (In FIG. 2, $\theta = 100\%$) in spite of the other input signals.

The next step 49 is a main blower control routine of which details are described latter, for controlling the main blower 6. In the subsequent step 50, a rear-seat representative signal S is computed in accordance with the following equation.

$$S = (Tr'-25) + K_1'(Ts'-25) + K_2'(Tm'-Tm_0') - K_3'(Td'-25) \quad (2)$$

Where $K_1'$-$K_3'$ are gains of the respective sensors and $Tm_0'$ is a reference value of the mode sensor 39.

Figure 6:
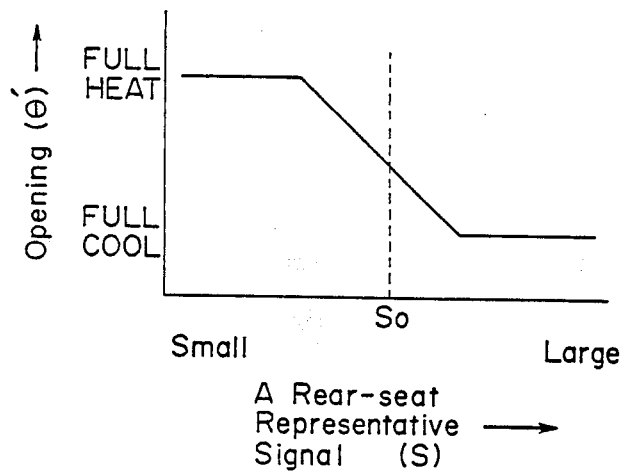
FIG. 6 is a graph illustrative of the controlling of a second air mix door with respect to a rear-seat representative signal value S.

In the next step 51, a second air mix door control signal is computed so as to bring the relationship between the position of the air mix door 24 and the representative signal S obtained by the equation (2) near to those values stored in the ROM (FIG. 6). In FIG. 6, So is the thermally balanced value of the representative signal S. The control signal is sent to the driver circuit 44d. However, when the rear-seat temperature setter 41 is set for maximum cooling MC or maximum heating MH, the microcomputer 30 outputs signals for keeping a position of the second air mix door 24 at full-cool (In FIG. 2, $\theta' = 0\%$) or full-heat (In FIG. 2, $\theta' = 100\%$) in spite of the other input signals.

The next step 52 is a rear-seat blower control routine of which is discussed in detail latter, for controlling the rear-seat blower 21. After this step 52, the computation is returned to step 47 and the said computation is executed circularly.

Figure 7:
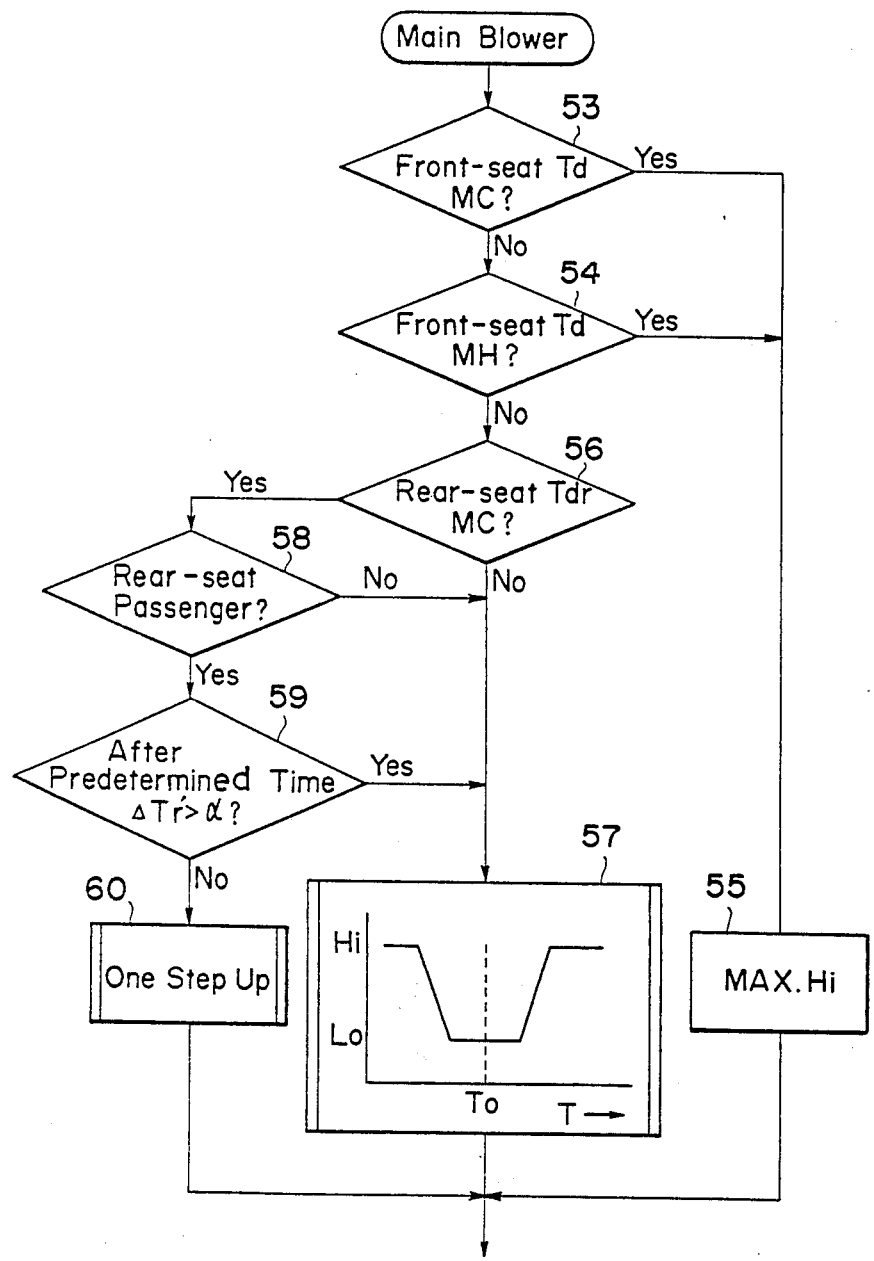
FIG. 7 is a flowchart showing the main blower control routine shown in FIG. 4.

In FIG. 7 a main blower control routine is shown. In the step 53, it is determined whether or not the front-seat temperature setter 35 is set for maximum cooling MC. If it is determined that the setter 35 has been set for maximum cooling MC, it outputs a signal to rotate the main blower 6 at maximum r.p.m. in the step 55, and if not, the program advances to the step 54. In the step 54, it is determined whether or not the front-seat temperature setter 35 is set for maximum heating MH, in a similar fashion to the step 53. If it is decided that the setter 35 has been set for maximum heating MH, it outputs a signal to rotate the main blower 6 at maximum r.p.m. and if not, the program advances to a step 56. In the step 56, it is determined whether or not the rear-seat temperature setter 41 is set for maximum cooling MC. In the other words, a determination is made as to whether or not the front-seat temperature setter 35 is set to maximum heating or cooling and whether or not the rear-seat temperature setter 41 set to maximum cooling in the steps 53, 54, 56, and these steps correspond to the deciding means 400 shown in FIG. 1.

In the step 56, if it is decided that the setter 41 has not been set for maximum cooling MC, the control signal is computed so as to bring the relationships between the r.p.m. of the main blower 6 and the representative signal T obtained by the equation (2) near those values stored in the ROM in the subsequent step 57. This control signal is sent to the driver circuit 44a. On the other hand, it is determined whether or not there is a passenger in the rear-seat part according to the output of the passenger switch 42. If there is no passenger, the program advances to the step 58 since it is not necessary to increase the amount of air blown into the rear-seat part. On the other hand, if there is a passenger in the rear-seat part, the program advances to a step 59. In the step 59, the microcomputer 30 calculates the difference value $\Delta Tr'$ between the temperature detected at an earlier time and the temperature detected at the present time by the rear-seat temperature sensor 38, and it is determined whether or not the value $\Delta Tr'$ is higher than a predetermined value $\alpha$. If $\Delta Tr' > \alpha$, the program advances to step 57, and if not, the program advances to a step 60. In the step 60, the r.p.m. of the main blower is changed one incremental step up. Accordingly, in this embodiment, the steps 55, 57, 60 correspond to the main blower control means 500 shown in FIG. 1.

Figure 8:
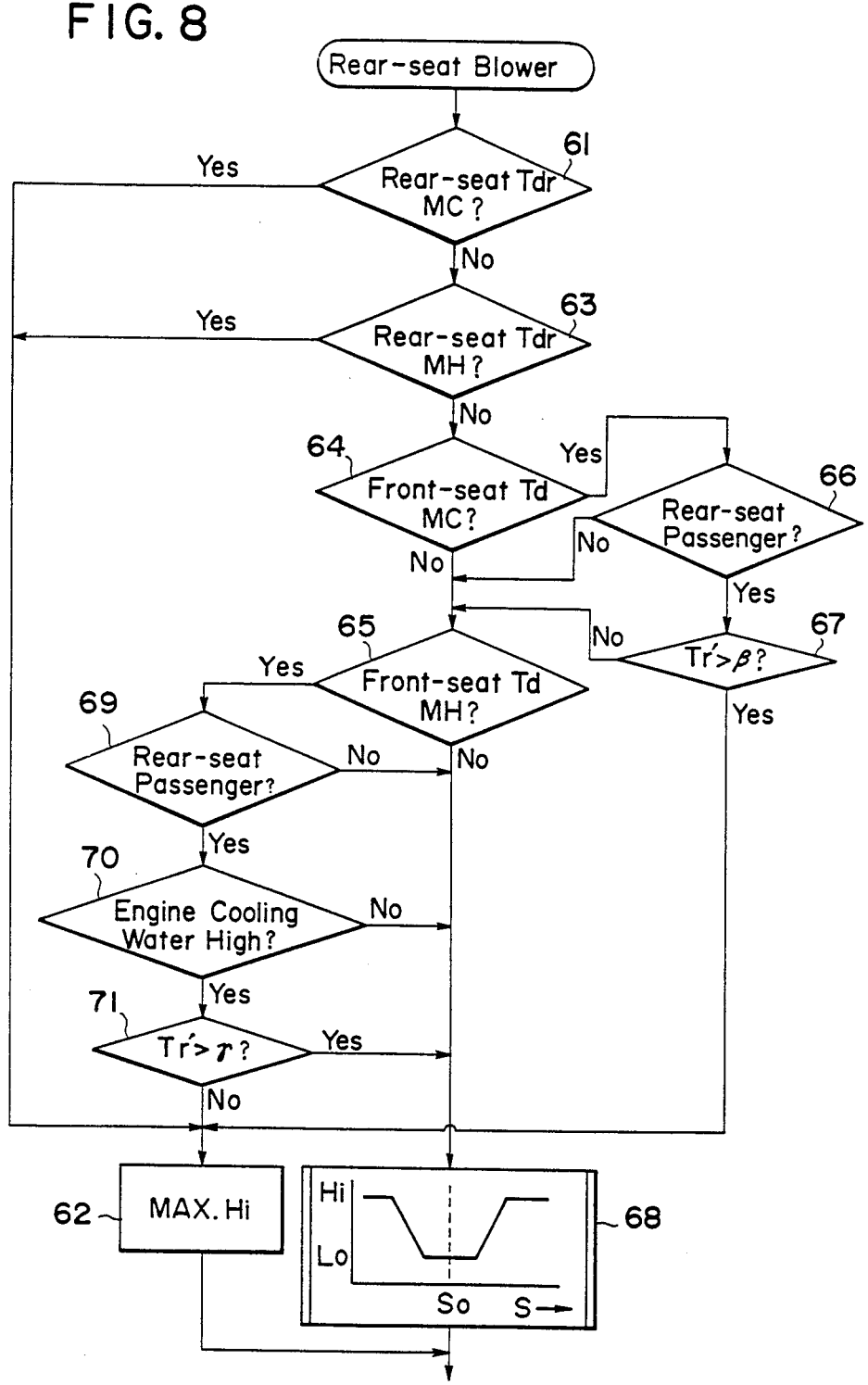
FIG. 8 is a flowchart showing the rear-seat blower control routine shown in FIG. 4.

The rear-seat blower control routine of FIG. 8 corresponds to the rear-seat blower control means 300 shown in FIG. 1. In the step 61, it is determined whether or not the rear-seat temperature setter 41 is set for maximum cooling MC. If it is determined that the setter 41 has been set to maximum cooling, it outputs a signal to rotate the rear-seat blower 21 at maximum r.p.m. in the step 62, and if it is determined that the rear-seat temperature setter 41 has not been set for maximum cooling MC, the program advances to the step 63. In this step 63, it is determined whether or not the rear-seat temperature setter 41 is set for maximum heating MH, and if so, rear-seat blower 21 is controlled so as to rotate at maximum r.p.m. in the next step 62, and if not, the program advances to a step 64.

In the step 64, it is determined whether or not the front-seat temperature setter 35 is set for maximum cooling MC. If it is determined that the setter 35 has not been set for maximum cooling MC, the program advances to the next step 65. On the other hand, if it is determined that the setter 35 has been set for maximum cooling MC, it is determined whether or not there is a passenger is in the rear-seat part in a step 66, according to the output signal of the passenger switch 44. In the step 66, if it is determined that there is no passenger, the program advances to step 65 since it is not necessary to control the amount of blown air for the rear-seat part, and if it is determined that there is a passenger, the program advances to the step 67. In the step 67, it is determined whether or not the temperature Tr' of the rear-seat part is higher than a predetermined value $\beta$. If $Tr' > \beta$, the program advances to the step 62, and the rear-seat blower 21 is rotated at the maximum r.p.m. since it is necessary to sweep away the air of the rear-seat part. On the other hand, if not, the program is advanced to the step 65.

In this step 65, it is determined whether or not the front-seat temperature setter 35 is set for maximum heating MH. If it is determined that the setter 35 has not been set for maximum heating MH, namely, both setters 35 and 41 have not been set for maximum cooling or maximum heating, the program advances to a step 68 since it is not necessary to control the rear-seat blower 21 according to the main blower 6. In the step 68, the rear-seat blower 21 is controlled according to the rear-seat representative signal S. In the step 65, if it is determined that the front-seat temperature setter 35 has been for maximum heating MH, it is determined whether or not there is a passenger in the rear-seat part in a step 69. If not, the program advances to the step 68, and if there is a passenger, the program advances to the step 70. In the step 70, it is determined whether or not the temperature of the engine cooling water is higher than a predetermined value, according to the output of the water temperature switch 43. If the temperature is lower than the predetermined value, the rear-seat blower 21 is normally controlled in the step 68. On the other hand, if the temperature is higher than the predetermined value, the program advances to a step 71. In the step 71, it is determined whether or not the temperature Tr' of the rear-seat part is higher than a predetermined value $\gamma$. If $Tr' > \gamma$, the rear-seat blower 21 is normally controlled in the step 68, and if not, it rotates at maximum r.p.m.

When at least one of the front-seat temperature setter 35 or the rear-seat temperature setter 41 is set for maximum cooling MC or minimum heating MH, the control pattern is the following.

| the front-seat setting Td | the rear-seat setting Tdr | the main blower | the rear-seat blower |
|---|---|---|---|
| MC | — | Max. Hi | *1 |
| MC | MC | Max. Hi | Max. Hi |
| — | MC | *2 | Max. Hi |
| MH | — | Max. Hi | *3 |
| MH | MH | Max. Hi | Max. Hi |
| — | MH | — | Max. Hi |

In the above table, the symbol "—" means that the setters 35 and 41 are set except for the maximum heating and the minimum cooling, and "Max.Hi" means that the r.p.m. of the blower 35 or 41 is fixed at maximum speed. The symbol "*1" means that the r.p.m. of the blower 21 is fixed at a maximum only when there is at least one passenger in the rear-seat part and $Tr' > \beta$, and "*2" means that the r.p.m. of the main blower 6 is changed one step up only when there is at least one passenger in the rear-seat part and $\Delta Tr'$ is lower than $\alpha$, and "*3" means that the r.p.m. of the rear-seat blower 21 is fixed at maximum only when there is at least one passenger in the rear-seat part, the temperature of the engine cooling water is high and Tr' is lower than $\gamma$. On the other conditions, the blowers 6 and 21 are normally controlled according to such control pattern as indicated in the steps 57 and 68.

Pattern "*2" is important one of the above control patterns. For example, if assuming that in summer, there has been a passenger in the front-seat part at the beginning and a passenger thereafter gets into the rear-seat part after a considerable length of time, then the blowers 6 and 21 are controlled as follows.

At the beginning, the front-seat temperature setter 35 and the rear-seat temperature setter 41 has not been set for maximum cooling MC since there were no demand for quick cooling if there had been a passenger only in the front-seat part during a considerable length of time. Consequently, the microcomputer 30 has been repeating the decisions and the computations in the steps 53, 54, 56, 57, so the main blower 6 has been controlled according to the normal control pattern and the microcomputer 30 has been repeating the decisions and the computations in the step 61, 63, 64, 65, 68, so the rear-seat blower 21 has been controlled according to the normal control pattern. When a passenger gets in the rear-seat part thereafter, the passenger may set the rear-seat temperature setter 41 to maximum cooling MC in order to lower the temperature of the rear-seat part quickly. In the rear-seat blower control routine, the result of the decision in the step 61 turns to "Yes" at this time, so the rear-seat blower 21 is controlled so as to rotate at maximum r.p.m. In the main blower control routine, the results of the decisions in the steps 56 and 59 turn to "Yes" respectively. In this case, if the cool down ratio of the temperature Tr' in the rear-seat part is small (i.e. $-\Delta Tr'$ is not greater than $\alpha$) when the rear-seat blower 21 rotates at maximum r.p.m., the result of the decision in the step 59 shall turn to "No", then the r.p.m. of the main blower 6 shall be changed one incremental step up so as to supply the shortage of the amount of the air blown into the rear-seat part by the treatment of the step 60. Consequently, the treatments of steps 53, 54, 56, 58, 59, 60 are repeated in the main blower control routine, and the main blower 6 speeds up as long as the air blown into the rear-seat part is lacking. Since the temperature Tr' in the rear-seat part is lowered quickly by the speed-up of the main blower 6, the result of the decision in step 59 turns to "Yes", and the main blower 6 becomes being controlled according to the normal control pattern. Further, though the maximum cooling MC and the maximum heating MH are set by the front-seat temperature setter 35 and the rear-seat temperature setter 41 in the above embodiment, it is possible to use a switch which is connected with the setter 35 or 41, or which is independent.

What is claim is:

1. An air conditioner system for vehicle including a passenger compartment having a front-seat part and a rear-seat part, said air conditioner system comprising:

(a) a front-seat air conditioner unit including a main duct, a blower disposed in said main duct for forcing air therethrough to said front-seat part, an evaporator disposed in said main duct and a heater core disposed in said main duct;

(b) a rear-seat blower unit including a rear-seat duct and a rear-seat blower disposed in said rear-seat duct for forcing air therethrough to the rear-seat part;

(c) at least one connecting passage interconnecting said main duct downstream of said main blower and said rear-seat duct upstream of said rear-seat blower;

(d) a means for setting a temperature of said front-seat part;

(e) a means for setting a temperature of said rear-seat part;

(f) a means for controlling said rear-seat blower according to control patterns which are dependant upon at least an output signal of said means for setting a temperature of said rear-seat part;

(g) a means for determining if said set temperature of said means for setting a temperature of said front-seat part and said means for setting temperature of said rear-seat part are at maximum or minimum values;

(h) a means for controlling said main blower according to control patterns which are dependant upon said means for determining.

2. An air conditioner system according to claim 1, wherein said means for controlling said rear-seat blower operates in accordance with a first control pattern according to which said rear-seat blower rotates at a maximum speed and a second control pattern according to which said rear-seat blower rotates at a speed which is changed in accordance with heating or cooling requirements of said rear-seat part.

3. An air conditioner system according to claim 1, wherein said means for controlling said main blower operates in accordance with a third control pattern according to which said main blower rotates at a maximum speed, and a fourth control pattern according to which said main blower rotates at a speed which is changed in accordance with heating or cooling requirements of said front-seat part, and a fifth control pattern according to which said main blower rotates at a speed which is changed one incremented step up higher.

* * * * *